US009583257B2

(12) United States Patent
Blomqvist et al.

(10) Patent No.: US 9,583,257 B2
(45) Date of Patent: Feb. 28, 2017

(54) MICROFLUIDICS CONTROLLED TUNABLE COIL

(71) Applicant: Nokia Corporation, Espoo (FI)

(72) Inventors: Kim Blomqvist, Espoo (FI); Pekka Korpinen, Espoo (FI); Helena Pohjonen, Espoo (FI); Markku Rouvala, Helsinki (FI); Chris Bower, Ely (GB)

(73) Assignee: Nokia Technologies Oy, Espoo (FI)

( * ) Notice: Subject to any disclaimer, the term of this patent is extended or adjusted under 35 U.S.C. 154(b) by 126 days.

(21) Appl. No.: 14/335,425

(22) Filed: Jul. 18, 2014

(65) Prior Publication Data

US 2016/0020017 A1 Jan. 21, 2016

(51) Int. Cl.

| | |
|---|---|
| ***H01F 27/02*** | (2006.01) |
| ***H02K 7/18*** | (2006.01) |
| ***H01F 29/00*** | (2006.01) |
| ***H01F 27/28*** | (2006.01) |
| ***H01F 38/00*** | (2006.01) |
| ***H01F 1/44*** | (2006.01) |
| ***H01F 21/06*** | (2006.01) |

(52) U.S. Cl.

CPC ............... *H01F 29/00* (2013.01); *H01F 1/44* (2013.01); *H01F 21/06* (2013.01); *H01F 27/28* (2013.01); *H01F 38/00* (2013.01); *H01F 1/447* (2013.01)

(58) Field of Classification Search

CPC ........................................................ H01F 21/06
USPC ........................................................... 336/94
See application file for complete search history.

(56) References Cited

U.S. PATENT DOCUMENTS

| | | |
|---|---|---|
| 7,189,359 B2 | 3/2007 | Yuan et al. |
| 7,454,988 B2 | 11/2008 | Tan |
| 7,477,123 B2 | 1/2009 | Beerling |

(Continued)

FOREIGN PATENT DOCUMENTS

| | | |
|---|---|---|
| EP | 2143948 A2 | 1/2010 |
| EP | 2706541 A2 | 3/2014 |

(Continued)

OTHER PUBLICATIONS

Abhari et al., “A Comprehensive Study of Micropumps Technologies,” Table 1, Classification of Micropumps. J. Electrochem. Sci., 7:9767 (2012).

(Continued)

*Primary Examiner* — Elvin G Enad
*Assistant Examiner* — Ronald Hinson
(74) *Attorney, Agent, or Firm* — Mintz Levin Cohn Ferris Glovsky and Popeo, P.C.

(57) ABSTRACT

In some example embodiments, there may be provided an apparatus. The apparatus may include a chamber including a first cavity and a second cavity, wherein the chamber further includes a first fluid suspended in a second fluid; a first electrode adjacent to the first cavity; a second electrode adjacent to the second cavity; a third electrode configured to provide a common electrode to the first electrode and the second electrode; and at least one coil adjacent to at least one of the first cavity or the second cavity, wherein an inductance value of the coil is varied by at least applying a driving signal between the common electrode and the first electrode and/or the second electrode. Related methods, systems, and articles of manufacture are also disclosed.

10 Claims, 11 Drawing Sheets

(56) References Cited

U.S. PATENT DOCUMENTS

| | | | | |
|---|---|---|---|---|
| 7,735,945 | B1 | 6/2010 | Sliwa, Jr. et al. | |
| 7,898,096 | B1 * | 3/2011 | Krupenkin | H02N 1/08 290/1 R |
| 8,045,318 | B2 | 10/2011 | Choi et al. | |
| 8,053,914 | B1 * | 11/2011 | Krupenkin | H02N 1/08 290/1 R |
| 8,742,649 | B2 * | 6/2014 | Krupenkin | H01G 5/012 290/1 R |
| 9,024,462 | B2 * | 5/2015 | Thramann | H02N 11/008 280/602 |
| 9,203,291 | B2 * | 12/2015 | Krupenkin | H02N 3/00 |
| 2009/0297406 | A1 * | 12/2009 | Okino | G01N 21/73 422/116 |
| 2012/0037400 | A1 | 2/2012 | Fields et al. | |
| 2013/0138359 | A1 | 5/2013 | Armstrong et al. | |
| 2014/0069783 | A1 | 3/2014 | Rofougaran | |

FOREIGN PATENT DOCUMENTS

| | | | |
|---|---|---|---|
| WO | WO-03026798 | A1 | 4/2003 |
| WO | WO-2010042637 | A2 | 4/2010 |
| WO | WO-2013041983 | A1 | 3/2013 |
| WO | WO-2013053039 | A1 | 4/2013 |

OTHER PUBLICATIONS

Blankenbach et al., "Novel highly reflective and bistable electrowetting displays," J. Soc. Inf. Display 16(2):237-244 (2008).

Dulger et al., "A 1.3-V 5-mW fully integrated tunable bandpass filter at 2.1 GHz in 0.35-?m CMOS," IEEE Journal of Solid-State Circuits, 38(6):918-925 (2003).

"Electrowetting Displays by adt," copyright 2011. <http://www.adt-gmbh.com/enttechnoloqvtasics-patent-background.html> Last Accessed Mar. 23, 2016. 1 page.

Hayes et al. "Video-speed electronic paper based on electrowetting" Nature 425:383-385 (2003).

Lee et al. "Electrowetting and electrowetting-on-dielectric for microscale liquid handling". Sensors and Actuators A 95, 2002, pp. 259-268.

Mugele, et al, "Electrowetting: from basics to applications," Journal of Physics: Condensed Matter 17(28):R705-R774 (2005).

Ning et al., "A tunable magnetic inductor," IEEE Transactions on Magnetics 42(5):1585-1590 (2006).

Rais-Zadeh et al., "An Integrated 800-MHz Coupled-Resonator Tunable Bandpass Filter in Silver With a Constant Bandwidth," Journal of Microelectromechan., 18(4):942-949 (2009).

Yue et al. "On-chip spiral inductors with patterened ground shields for Si-based RF ICs," IEEE Journal of Solid-State Circuits 33(5):743-747 (1998).

* cited by examiner

MICROFLUIDICS CONTROLLED TUNABLE COIL

FIELD

The subject matter described herein relates to tunable coils.

BACKGROUND

A coil (also referred to as an inductor) is an electronic component. This component may be implemented using an electrical conductor wound one or more times to form a shape of a coil, a spiral, or a helix. As such, when an electric current flows through the windings, the coil may have an inductance value. The inductance value for a coil of wire may be approximated by the following equation:

$$L = \frac{N^2 \mu A}{l}$$

where

L is the inductance of the coil in henries (H);

N is the number of turns in the wire coil (for example, a loop of wire has an N equal to 1);

$\mu=\mu_r\mu_0$ is the permeability of the core material or medium;

$\mu_r$ is the relative permeability of the core material or medium relative to the permeability of a vacuum;

$\mu_0$ is the permeability of the vacuum (approximately $4\pi(10^{-7})$ H/m, where m is meter);

A ($m^2$) is the average area of the core; and l is the average length of the coil wiring in meters.

Some inductors may be tunable, and these tunable inductors can be used for tunable filtering, tunable matching, tunable harmonic suppression, tunable oscillators, and the like. Some surface mount device (SMD) tunable coils rely on a mechanical screw to tune the coil. When this is the case, mechanical tuning is commonly performed only once during the assembly, and once tuned, the mechanical tuning may not be easily changed afterwards.

SUMMARY

In some example embodiments, there may be provided an apparatus. The apparatus may include a chamber including a first cavity and a second cavity, wherein the chamber further includes a first fluid suspended in a second fluid; a first electrode adjacent to the first cavity; a second electrode adjacent to the second cavity; a third electrode configured to provide a common electrode to the first electrode and the second electrode; and at least one coil adjacent to at least one of the first cavity or the second cavity, wherein an inductance value of the coil is varied by at least applying a driving signal between the common electrode and the first electrode and/or the second electrode.

In some variations, one or more of the features disclosed herein including the following features can optionally be included in any feasible combination The applied driving signal may move the first fluid. The moving may cause a change in a permeability of at least one of a core of the coil or a medium adjacent to the coil. The first electrode may be in contact, directly and/or through a coating, with at least one of the first fluid or the second fluid. The first fluid and/or the second fluid may include one or more particles and/or one or more nanoparticles having a certain permeability. The driving signal may provide a field that affects the move of the first fluid. The field may be produced by the driving signal includes at least one of an electric field, a magnetic field, and/or a combination of the two. The at least one coil may provide at least one of first electrode, the second electrode, and/or the common electrode. The chamber may be arranged at least one of on top, below, inlaid and/or within a substrate, and wherein the coil is arranged at least one of on top, below, inlaid, and/or within the substrate. A plurality of cavities may be arranged into a chain structure and/or a grid structure, wherein at least one coil is arranged adjacent to at least one of the cavities.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
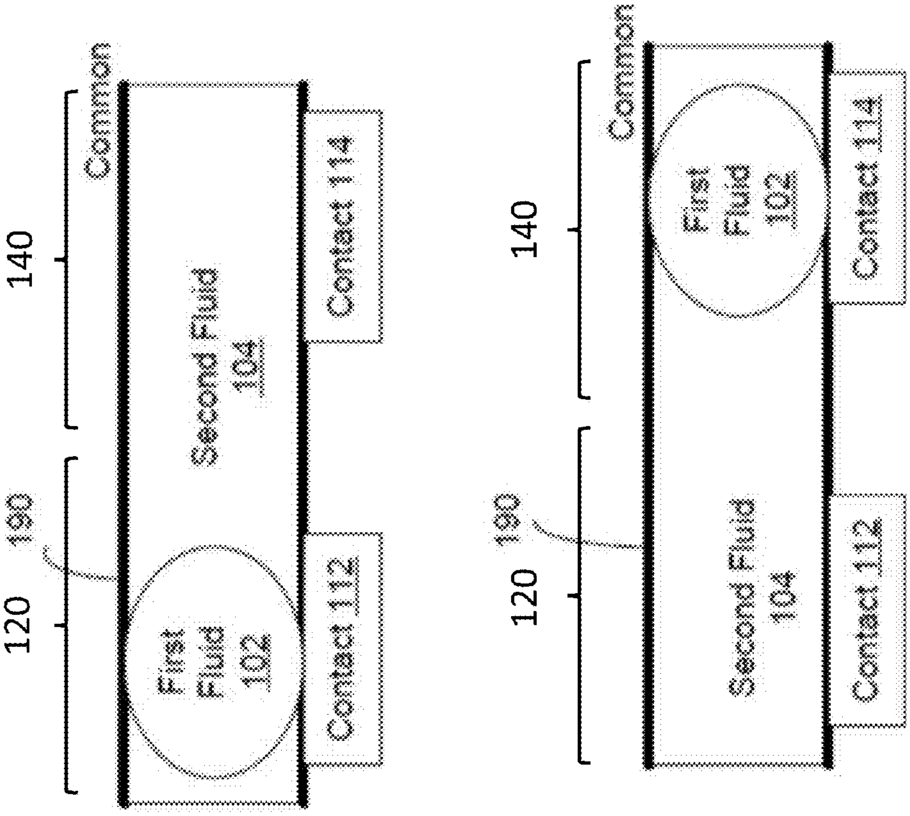
FIG. 1 depicts an example system for electrowetting, in accordance with some example embodiments.

Like labels are used to refer to same or similar items in the drawings.

DETAILED DESCRIPTION

The subject matter disclosed herein may, in some example embodiments, relate to a tunable coil in which the inductance is varied by feeding certain amounts of material into a core of the coil and/or its adjacent space/medium. In some example embodiments, a feeding mechanism may provide to the core a small quantity of a material having a certain permeability to change the permeability of the core and/or its adjacent space and thus the inductance of the coil. In some example embodiments, the feeding mechanism may be configured to provide the material into the core based on a microfluidic mechanism, such as electrowetting. In some example embodiments, the microfluidic technique may provide a certain dose or quantity of material, such as a fluid, in a measured and/or controlled way into a cavity serving as a core for a coil. In some example embodiments, the tunable coil may be used in various discrete and/or integrated forms to provide a dynamically tunable system. This kind of tunable system may be utilized in a radio front-end to for example provide a tunable filter or channel selector for the radio.

The subject matter disclosed herein may, in some example embodiments, relate to measuring an amount of a liquid (for example, in liters and the like) that flows between cavities (for example, natural or excited in some way). The amount of liquid in a cavity may be measured indirectly via an inductance measurement or using another kind of sensor, such as a capacitive sensor, a resistive sensor, and/or an optical sensor.

Although some of the examples disclosed herein refer to dosing for a coil, the dosing disclosed herein may be used in other applications, such as medical, microfluidics, semiconductors, chemical, and the like as well. For example, in some example embodiments, the microfluidic technique, such as electrowetting disclosed herein may be used to measure a quantity of a fluid or other type of material being dispensed.

Electrowetting (also referred to herein as microwetting) may refer to using a voltage, electric field, and/or magnetic field to move for example a fluid, such as a droplet. See, for example, "Electrowetting: from basics to applications" F. Mugele and J-C. Baret, Journal of Physics: Condensed Matter, July 2005, vol. 17, pp. R705-774. In some implementations, the conductive electrodes may come into direct contact with the fluid, which may pose issues with electrolysis of the electrodes. To avoid this electrolysis, a coating, such as dielectric layer may be used on top of the electrodes, which may enable much higher voltages (in which case this is usually called electrowetting on dielectric). Moreover, a low surface energy, low hysteresis coating on top of the dielectric (generally a fluoropolymer) may be used as well to enable reversible wetting.

FIG. 1 depicts a first fluid 102, such as water, in a second fluid 104, such as oil, moving from a first position over contact 112 (which is adjacent to cavity 120) to a second position over contact 114 (which is adjacent to cavity 140). The movement may be caused by an electric (or electromagnetic) force/field generated by a driving signal between the first contact 112 and common contact 190 and/or between the second contact 114 and common contact 190. For example, one or more voltage pulses may be applied between the contact 112 and common contact 190 to affect the position of droplet 102 as shown in FIG. 1 where the one or more pulses cause droplet movement from a location near contact 112 to a position near contact 114. Additional examples of electrowetting (on dielectric) are described by "High Reflective & Bi-Stable Electrowetting Displays," K. Blankenbach et al., Special Section on Extended Papers Selected From the 2007 SID Symposium, Journal of the Society for Information Display, February 2008, vol. 16, Issue 2, pp. 237-244. As noted, the contacts 112 and 114 may be in contact with the fluids and/or may have coatings, such as a dielectric layer and the like as noted above.

Although FIG. 1 depicts the droplet being moved from the first cavity to the second cavity, the driving signal may drive the droplet from the second cavity to the first cavity as well.

The first fluid 102 and/or second fluid 104 may include one or more particles, such as nanoparticles. The first fluid 102 may be affected by the field generated by contacts 112 and 114. After the droplet 102 is moved to a location, a constant voltage or current may no longer be needed at the contacts 112/114 or common 190 as the state of droplet 102 in its new location is relatively stable. For example, once droplet 102 is moved to a position near contact 114, substantially no energy (for example, voltage and/or current) is need to keep the droplet 102 at a position near contact 114.

In some example embodiments, a coil is provided which can be tuned, so that the inductance changes based on electrowetting. Specifically, one or more of the fluids used in electrowetting may include one or more particulates (or particles) that have a relatively high magnetic permeability (μ). Examples of such materials include ferrite, manganese, zinc, nickel-zinc, iron, nickel, cobalt, permalloy, neodymium, cobalt-iron, and/or any combination thereof. Moreover, these materials should be small in size to avoid sedimentation or settling in solution due to large material density. For example, the material may be in the form of nanoparticles. The particles suspended in the fluid may be composed of magnetic material that is sensitive to the a magnetic field generated by the contacts (or coils) at the desired operating frequencies. In this way, the magnetic field generated by for example the coils may be used to move the fluid/material containing the suspended particles.

As noted, the fluid including the particles having high permeability may be introduced or dosed into a core or medium adjacent to the coil in a controlled way to dynamically vary the permeability of the core or medium adjacent to the coil and thus the inductance of a coil. Accordingly, the coil may be considered a tunable coil, in accordance with some example embodiments.

Figure 2:
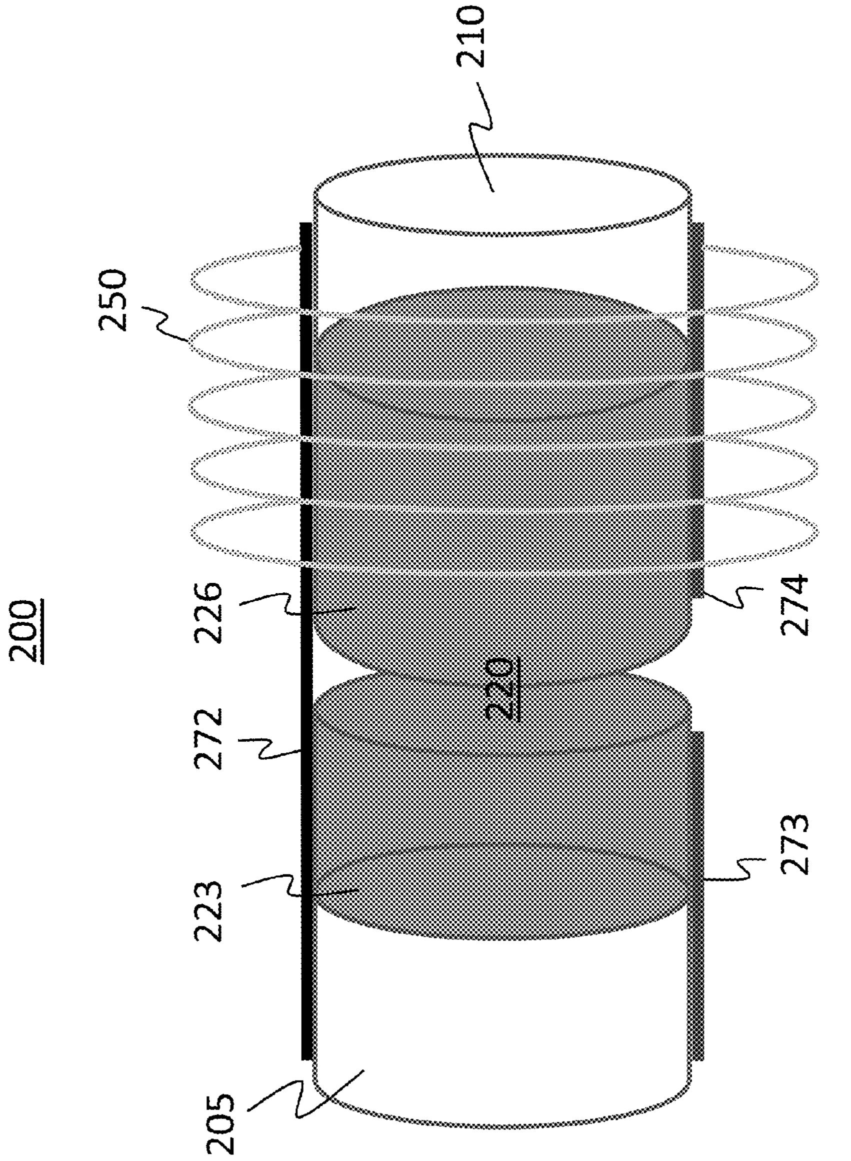
FIG. 2 depicts an example of a tunable coil based on electrowetting, in accordance with some example embodiments.

FIG. 2 depicts a chamber having first cavity 205 and a second cavity 210, in accordance with some example embodiments. FIG. 2 also depicts at least one winding 250, so the second cavity 210 may provide a core for the windings 250 of the coil, in accordance with some example embodiments.

When a fluid/droplet 220 is driven by a driving signal from the first cavity 205 in to the second cavity 210, the inductance value of coil 250 varies due to the increase in the effective permeability caused by the introduction of the droplet volume 226 into the second cavity 210. The amount of fluid in the droplet volume 226, size of the particle in the droplet, permeability of the particles in the droplet, and other factors may affect the permeability of cavity 210 and thus the inductance. For example, depending on how deep into the core 210 the droplet 220 is driven, the greater is the change of the inductance.

The tunable coil 200 depicted at FIG. 2 shows one or more coil windings 250 and the introduction of certain quantities of the fluid, such as a droplet having a relatively high permeability. The droplet may be moved from the first cavity 205 into the second cavity 210 using electrowetting. For example, a pulsed or driving voltage may be applied to move the droplet 220 in the first cavity 205, partially or totally, to the second cavity 210. These cavities 205 and 210 may be very small (for example, about 10 to 100 micrometers in diameter and manufactured with microelectronic methods, although other sized chamber/cavities may be used as well).

The droplet 220 may be composed of a liquid within an immiscible liquid, such as an oil/water mixture containing one or more particles having a relatively high permeability, where the particles can be located in either phase depending upon their surface functionalization. Furthermore, the immiscible liquids may also have the property of large differences in the electrical polarizability (polarity) such that one liquid is more susceptible to a change in surface tension on application of an applied electric field. If polarizable liquid water is used or if a higher temperature range is desired, alternatives such as propylene carbonate, diethylcarbonate, diacetone alcohol, cyclohexanone, butylacetate, propylacetate and ethylhexanol may be used as well. Examples of the non-polarizable liquid may include immiscible oils such as silicone oils, paraffin oils or organic liquids, such as alkanes, aromatic compounds.

Droplet 220 may, as noted, be transferred from the first cavity 205 to the second cavity 210 by applying a driving voltage or pulse(s) across the common 272 and electrodes 273 and/or 274. The drive signal may be for example 15-20 volts direct current (DC) or pulsed DC, although other types and forms of signals and voltage amounts and polarities may be used as well. The current of the drive signal may be in the range of a few milliamps (although other current amounts may be used as well) during the transfer from the first to the second cavity. As noted, about zero (or negligible) current is needed after the droplet 220 containing the particles has been transferred to the second cavity 210 as the droplet may be in a relatively stable state. The typical velocity of the drop may be about 0.1-1 cm/s, although other velocities may be attained as well. In some example embodiments, the inductor coil 250 may be used to create a magnetic field that moves the high permeability liquid between cavities 205 and 210.

Figure 3A:
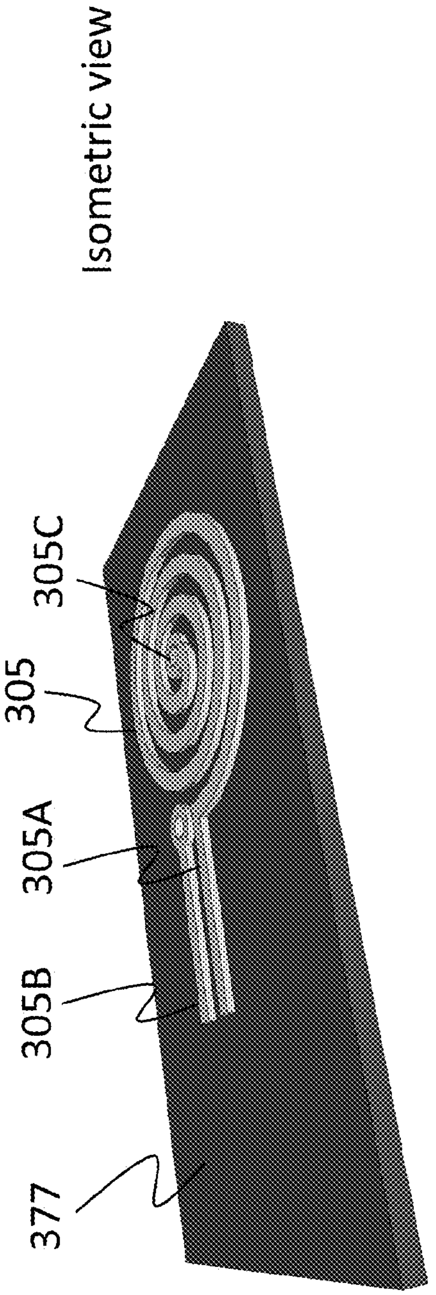
FIG. 3A depicts an example of a planar spiral coil, in accordance with some example embodiments.
Figure 3B:
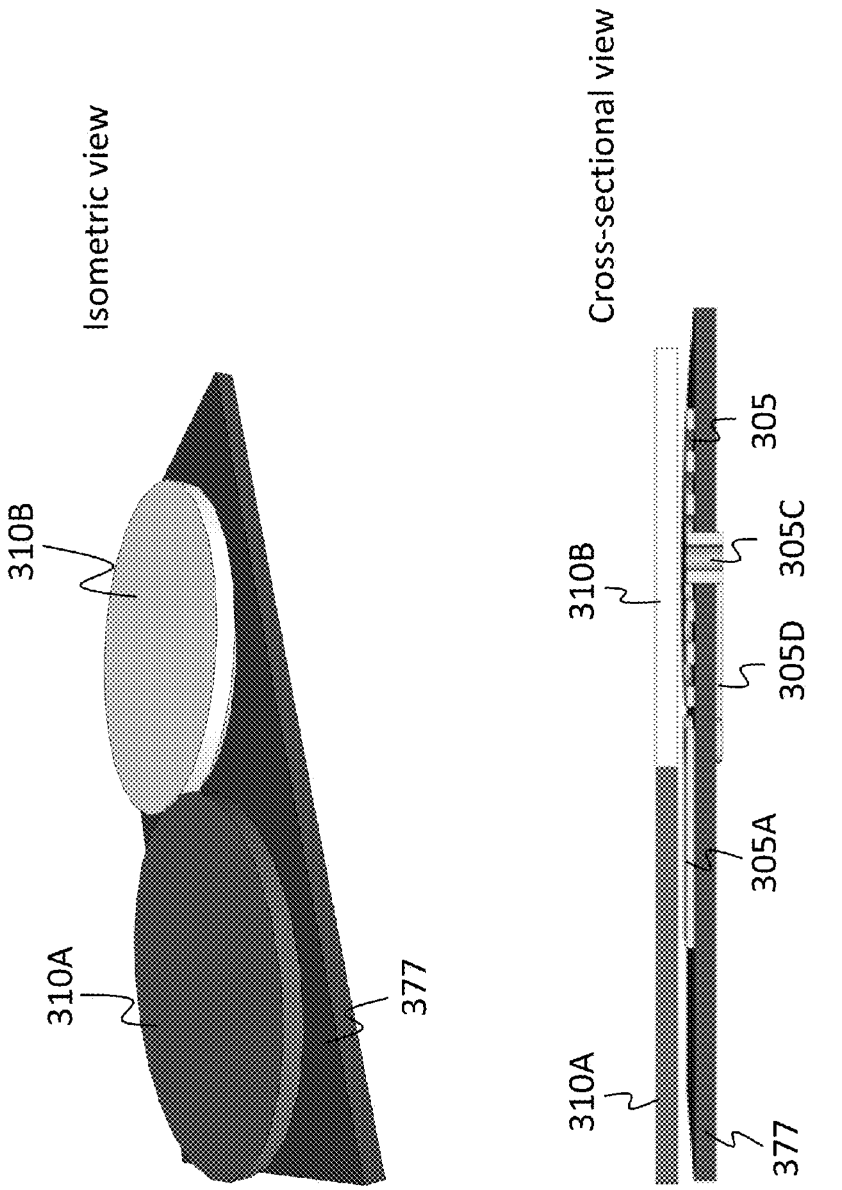
FIG. 3B depicts isometric and cross-section views of a tunable planar coil based on electrowetting, in accordance with some example embodiments.

FIG. 3A depicts an example implementation of an integrated planar spiral coil 305 including contacts 305A-C, in accordance with some example embodiments, which may be made tunable using electrowetting as depict in FIG. 3B. Although FIG. 3A depicts a planar spiral coil 305, the coil may take other forms such as a toroidal coil, a helix, a meander, and the like.

Figure 3C:
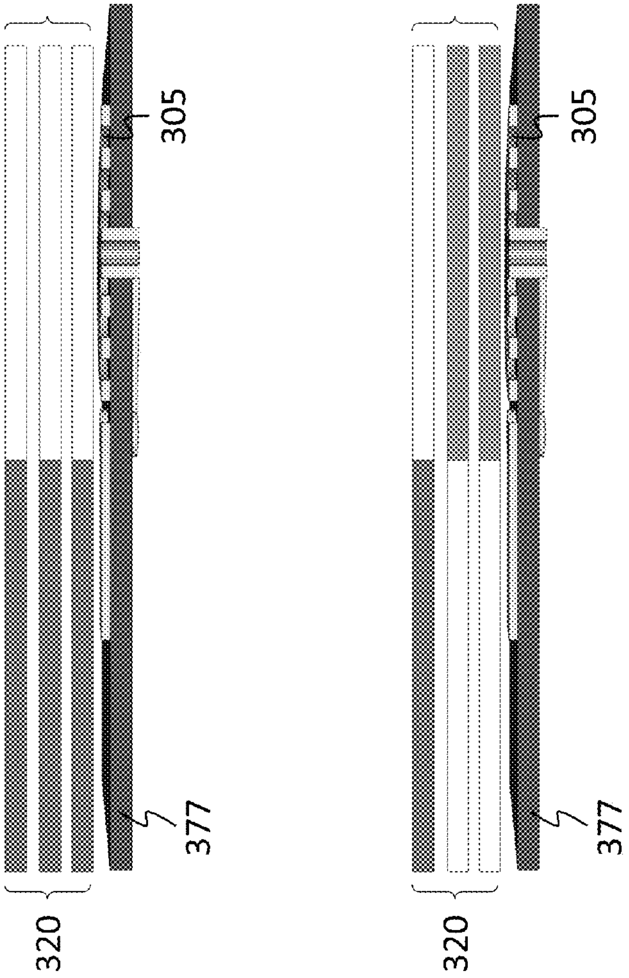
FIG. 3C depicts an additional example of a tunable coil based on electrowetting, in accordance with some example embodiments.

The planar spiral coil 305 may be positioned under one or more chamber structures as shown at FIG. 3B-C, in accordance with some example embodiments. In the example of FIG. 3B, there is a chamber having a first cavity 310A and a second cavity 310B. In this example, moving the droplet, partially or totally, having one or more particles from cavity 310A to cavity 310B (and vice versa) changes the permeability of the medium adjacent to the coil and thus inductance of coil 305. Wiring 305D connects the contact 305B with the middle contact of the coil 305C.

Although FIG. 3B depicts a single chamber on top of the coil, other quantities and locations of chambers may be used as well. For example, a chamber structure may be placed below the printed circuit board (PCB) 377, and a plurality of chambers may be used on top and/or bottom sides of the PCB 377 to configure the permeability of the medium adjacent to the coil 305. The chamber may also be inlaid into PCB.

Moreover, although FIG. 3A-B depicts single coil on top of the PCB, other quantities, locations and substrates may be used as well. For example the coil may be placed on the bottom side of the PCB, within the PCB, on top/bottom of a ceramic, on top/bottom of a dielectric layer (silicon oxide, silicon nitride, and the like), and so forth.

FIG. 3C depicts an example having three-layer droplet chamber structure 320 on top of coil 305, in accordance with some example embodiments.

In the example of FIG. 3C, the chamber structure 320 includes three chambers each having a droplet dissolved one or more particles. To change the permeability of the medium adjacent to the coil 305, one or more of the droplets of chamber structure 320 may be moved, partially or totally, from left-hand side cavity to right-hand side cavity as shown at FIG. 3C. This droplet(s) movement may, as noted above, change the permeability of medium adjacent to the coil 305 and thus the inductance of coil 305, in accordance with some example embodiments. Although FIG. 3C depicts two droplets being moved, other quantities of droplets may be moved as well. Moreover, the droplets may be driven back from the right-hand side cavities to the left-hand side cavities to change the permeability of the medium adjacent to the coil 305 and thus the inductance of coil 305.

In some example embodiments, the inductance value of the coil 305 may be varied by the quantity of stacked chambers and/or fill-ratio/amount (for example, the amount of material moved into the centre of the coil or left-hand side cavity). For example, adding additional layers of chambers may increase the inductance tuning range by introducing more fluid having a certain permeability. Moreover, the type of liquid in the chambers, the type of particles (for example, the permeability of the particle(s)) suspended in the liquid, the dimensions of the particles, and/or the mutual distances of the droplet chambers may affect to the inductance value of the coil 305. In some example embodiments, the particles suspended in the droplet may all need to be nanometer sized, such as 1-1000 nm, to avoid sedimentation and settling out of solution, although other particle sizes may be used as well.

Figure 4:
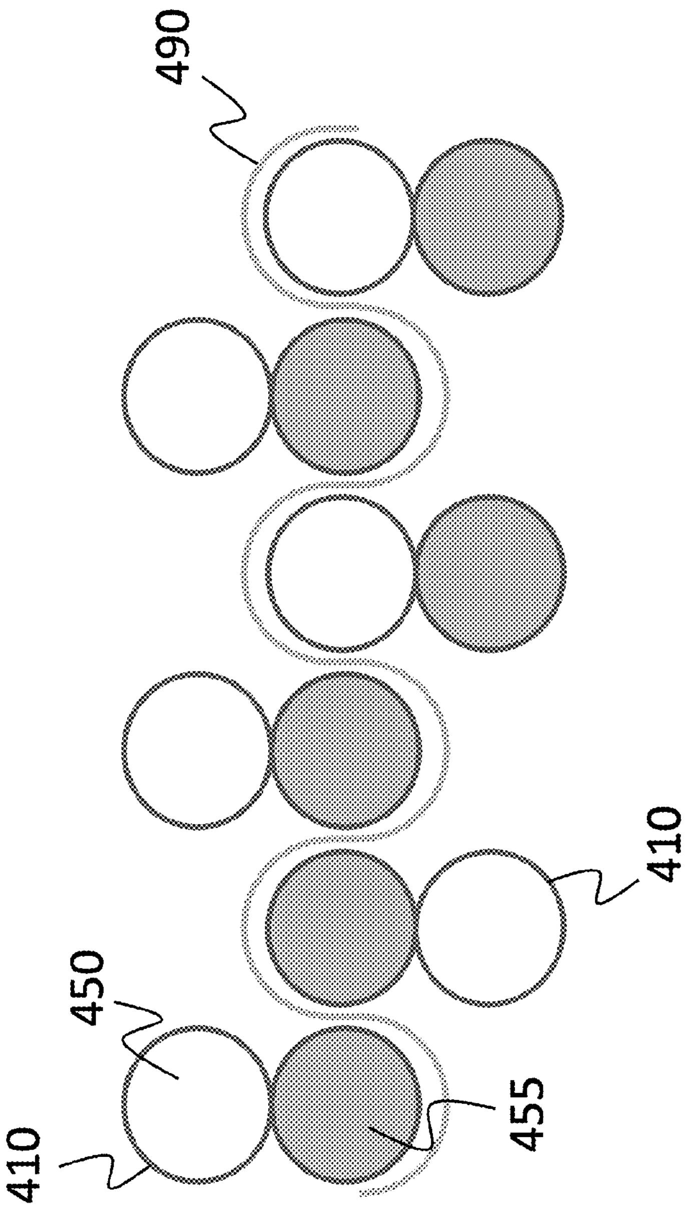
FIG. 4 depicts an additional example of a tunable coil implemented using a meandering type coil based on electrowetting, in accordance with some example embodiments.

FIG. 4 depicts a top view of meander type coil, in accordance with some example embodiments. In the example of FIG. 4, one or more droplet chambers 410 may be placed along the bends of the coil 490, wherein the droplet moved between the cavities 450 and 455 of the chamber 410 vary the permeability of the medium adjacent to the coil bends and thus inductance as disclosed herein.

Figure 5:
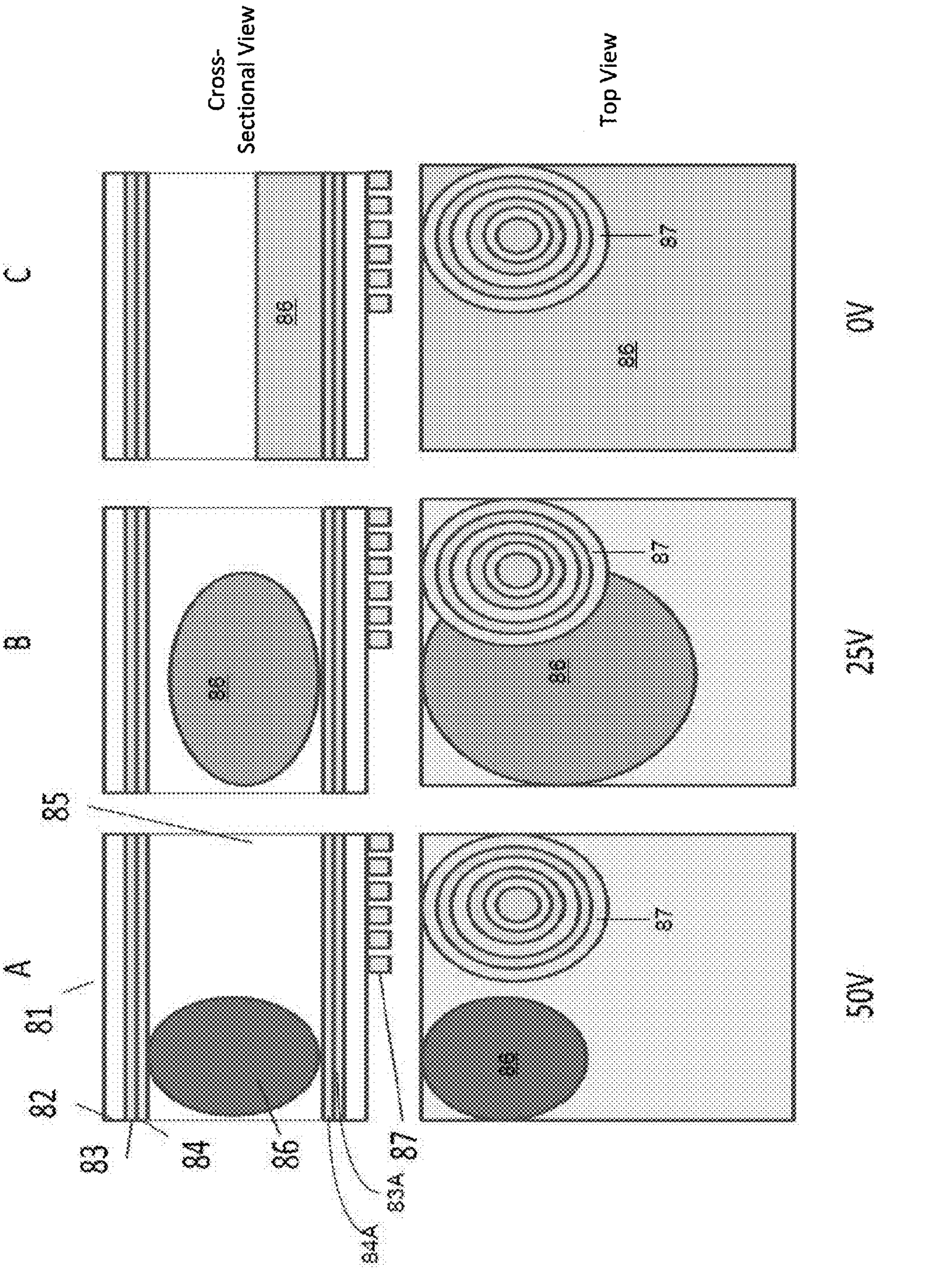
FIGS. 5 and 6 depict cross-sectional and top views of examples of tunable coil cells having different voltages applied to affect movement of a fluid or droplet, in accordance with some example embodiments.

FIG. 5 depicts a bi-stable tunable coil/inductor cell 81 using electrowetting on a dielectric of oil with high permeability nanoparticles, in accordance with some example embodiments.

The windings of the coil 87 and droplet 86 are shown via a cross-sectional view and a top view. Generally, as the driving signal is changed in A, B, and C, the permeability of the medium adjacent to the coil 87 is changed and thus the inductance of the coil changes. For example, the voltage between a common electrodes 83 and 83A is changed to vary the permeability of the medium and thus the inductance of the coil. In the example of FIG. 5, decreasing the driving voltage from about 50 volts to about 25 volts allows the fluid 86 to partially fill the medium adjacent to the coil 87, changing thus the permeability of the medium adjacent to the coil and thus the inductance of the coil. FIG. 5 also shows decreasing the voltage from about 25 volts to about 0 volts allows the fluid 86 to totally fill the medium adjacent to the coil 87, further changing the permeability of the core and thus the inductance of the coil. Although FIG. 5 depicts specific voltages, other values may be used as well.

In the example of FIG. 5, a sealed electrowetting cell 81 is depicted, in accordance with some example embodiments. The cell 81 may include one or more layers, such as a substrate 82, a common continuous conductive electrode 83 coated with a hydrophobic dielectric layer 84 having low surface energy. The layers may also include a low hysteresis layer containing a conductive liquid 85 (which may be water with added salt or an ionic liquid). The cell may also include a droplet 86, which may be implemented as immiscible oil containing particles of high permeability, such as ferrite particles. The cell 81 may further include another conductive electrode 83A coated with a hydrophobic dielectric layer 84A. Lastly, inductive coil windings 87 may sit on the electrowetting cell 81.

The inductance of coil 87 may be dynamically tuned by applying a voltage across the electrodes 83-83A of electrowetting cell 81. When no voltage is applied (see C), the oil layer 86 may sit on the hydrophobic dielectric layer. As an increasing voltage is applied, the oil 86 progressively de-wets from the hydrophobic dielectric layer to minimize the contact area as shown in the progression from C at 0 volts to B at 25 volts, to C at 50 volts. This may allow the concentration of ferrite particles sitting above the inductor coil 87 to be controlled. Suitable materials for the hydrophobic dielectric layer having low wetting/dewetting hysteresis include for example flouropolymers, such as CYTOP (Asahi Glass Corp.) or AF1600 solution processed Teflon from Dupont, although other materials may be used as well.

Although the previous example shows three voltages being used, other voltages may be used in order to attain a certain state/concentration of the ferrite particles.

Although the previous example (as well as FIG. 2) shows continuous (solid) electrodes, patterned type electrodes may be used to avoid capacitive and inductive coupling between the electrode and the coil. This coupling may, in some implementations, deteriorate the performance of the coil, for example by clearly decreasing its quality factor (Q). See, for example, "On-Chip Spiral Inductors with Patterned Ground Shields for Si-Based RF IC's" C P Yue and S S Wong, May 1998, IEEE Journal of Solid-State Circuits, vol. 33, pp. 743-747. In some implementations, the coil can be additionally utilized as an electrode, for example to remove the need of separate common electrode.

Figure 6:
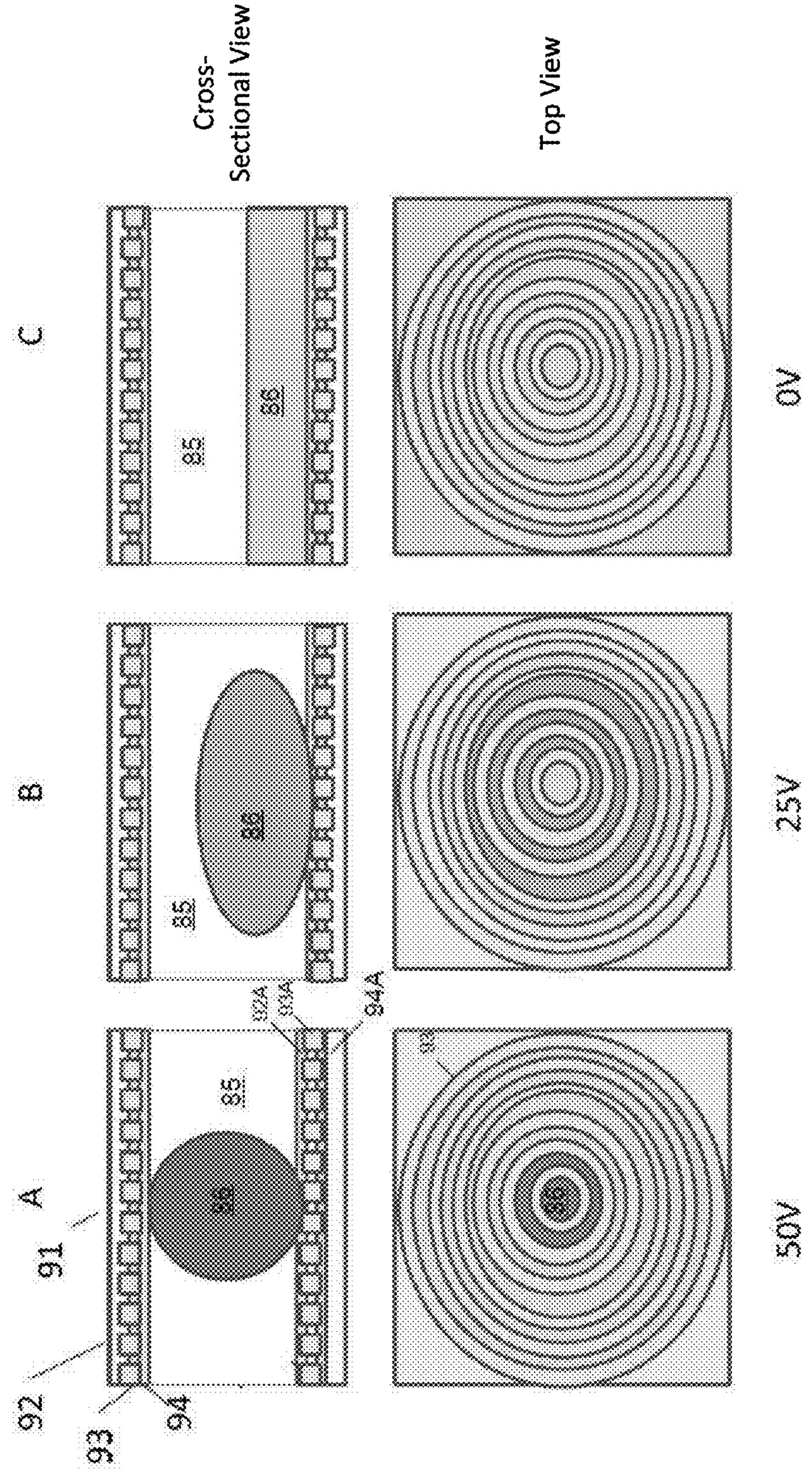

FIG. 6 depicts cross-sectional and top views of a bi-stable tunable inductor at various applied voltages, in accordance with some example embodiments. The inductor coil 93 may be fabricated on a substrate 92 both above and below the electrowetting cell 91. The inductor coil may be used to replace the continuous electrodes shown in FIG. 5. The hydrophobic, low hysteresis coating 94 may be applied directly on top of the inductive coil structure 93 to create a set of concentric rings having a crenellated topology that acts as pinning points for the oil layer 86 suspended in the liquid layer 85. The bottom of the cell 91 also includes a substrate layer 92A, upon which the inductor coil 93A and hydrophobic, low hysteresis coating 94 is placed. When a voltage is applied between the top and bottom inductive coils 93 and 93A, the oil layer 86 is progressively moved towards the center of the rings of the coil (as shown in FIG. 6 as the voltage change progress from for example 50 volts at A to 0 volts at C) and remains pinned by the coils 93-93A once it has crossed a ring as shown in C.

Figure 7:
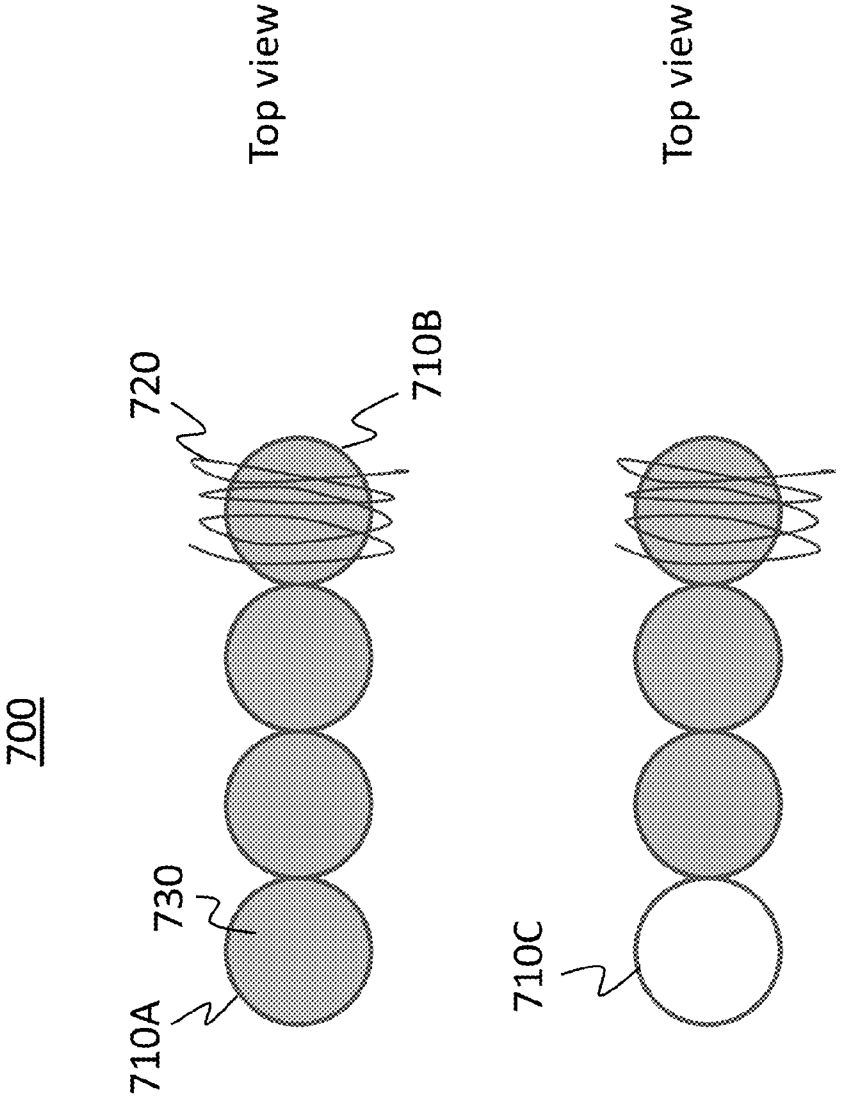
FIG. 7 depicts a droplet dispenser based on electrowetting along with a sensor to measure the dispensed amount of material/fluid, in accordance with some example embodiments.

FIG. 7 depicts a dispenser 700 based on electrowetting, wherein several cavities 710A-B are chained having at least one coil 720 next to at least one cavity 710B. Droplets 730 within the cavities 710A-B are dispensed one at time from the cavity 710B leaving one cavity empty 710C. In this embodiment, the coil is used as a sensor (instead of tunable inductor) to accurately measure the amount (e.g., in liters and the like) of dispensed fluid/material. Although, the FIG. 7 depict the coil 720 as a sensor, any other kind of sensor can be used as well, for example, capacitive, resistive, and/or optical. Moreover, although a chain of cavities is shown other constructions, for example a grid like, can be used as well.

Figure 8:
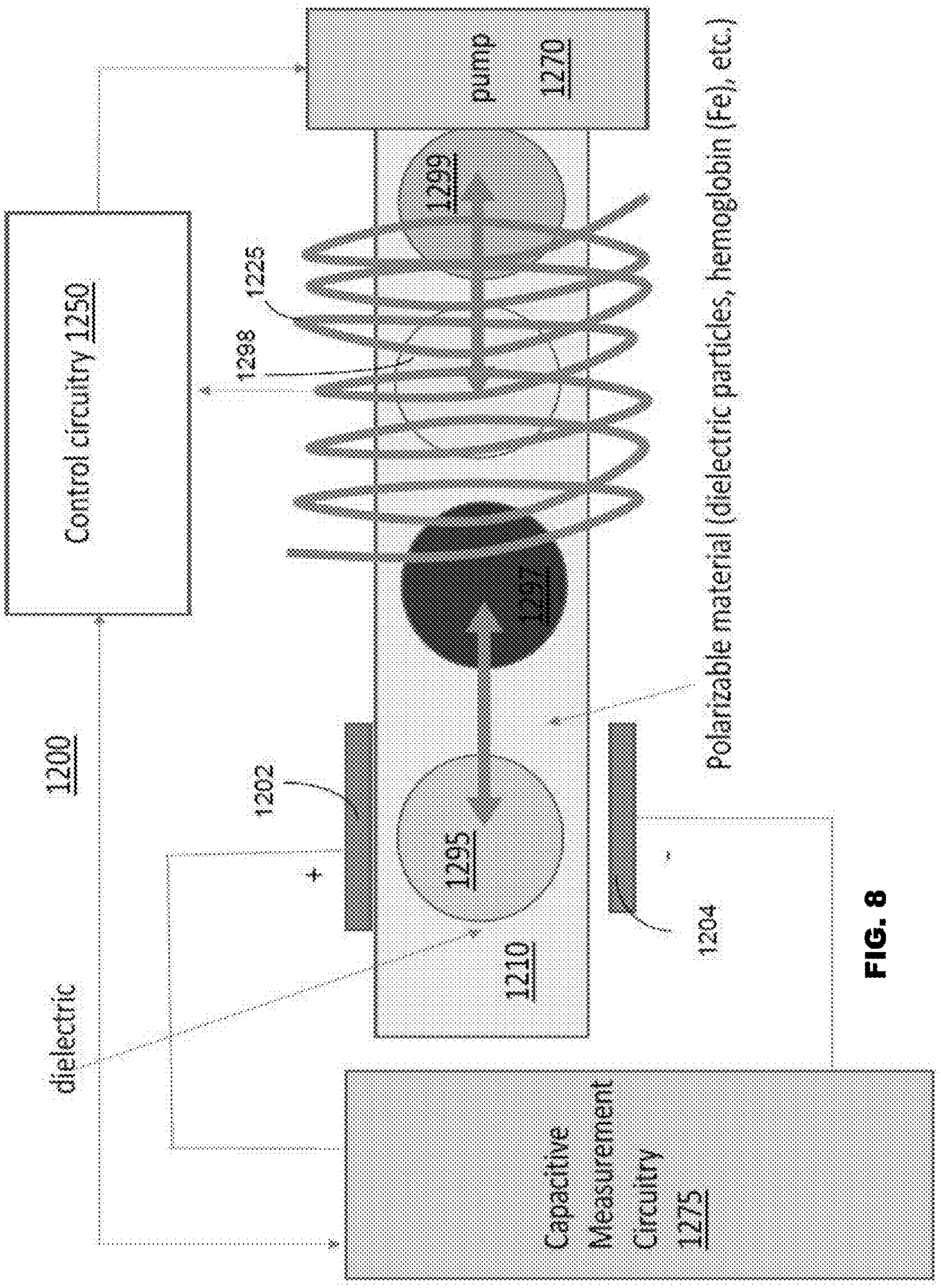
FIG. 8 depicts an example of fluid measurement device, in accordance with some example embodiments.

FIG. 8 depicts a system 1200 for measuring a dispensed material, such as a fluid, in accordance with some example embodiments.

System 1200 includes control circuitry 1250 to control a pump 1270 which pumps liquids 1299-1295 into a chamber 1210 and control measurement circuitry 1275. The chamber

1210 may have electrodes 1202 and 1204 placed alongside the chamber in order to measure changes in the chamber as the fluid 1299-1295 is pumped into chamber 1210. The measured changes may be measured by measurement circuitry 1275. In some example embodiments, measurement circuitry 1225 may measure a change that occurs as the fluids 1299-1295 are introduced by pump 1270 into the chamber 1210. This change may be for example a capacitive or an inductive change. The measured value may correspond to a property or an amount of the fluids 1299-1295 being introduced into chamber 1210. The pump 1270 may be controlled by control circuit 1250 to pump (for example, push or suck) a certain amount of liquid into the inductor 1225, so that the right amount of fluids 1299-1295 are pushed into, or sucked from, the capacitor measurement unit 1202-1204.

Figure 9:
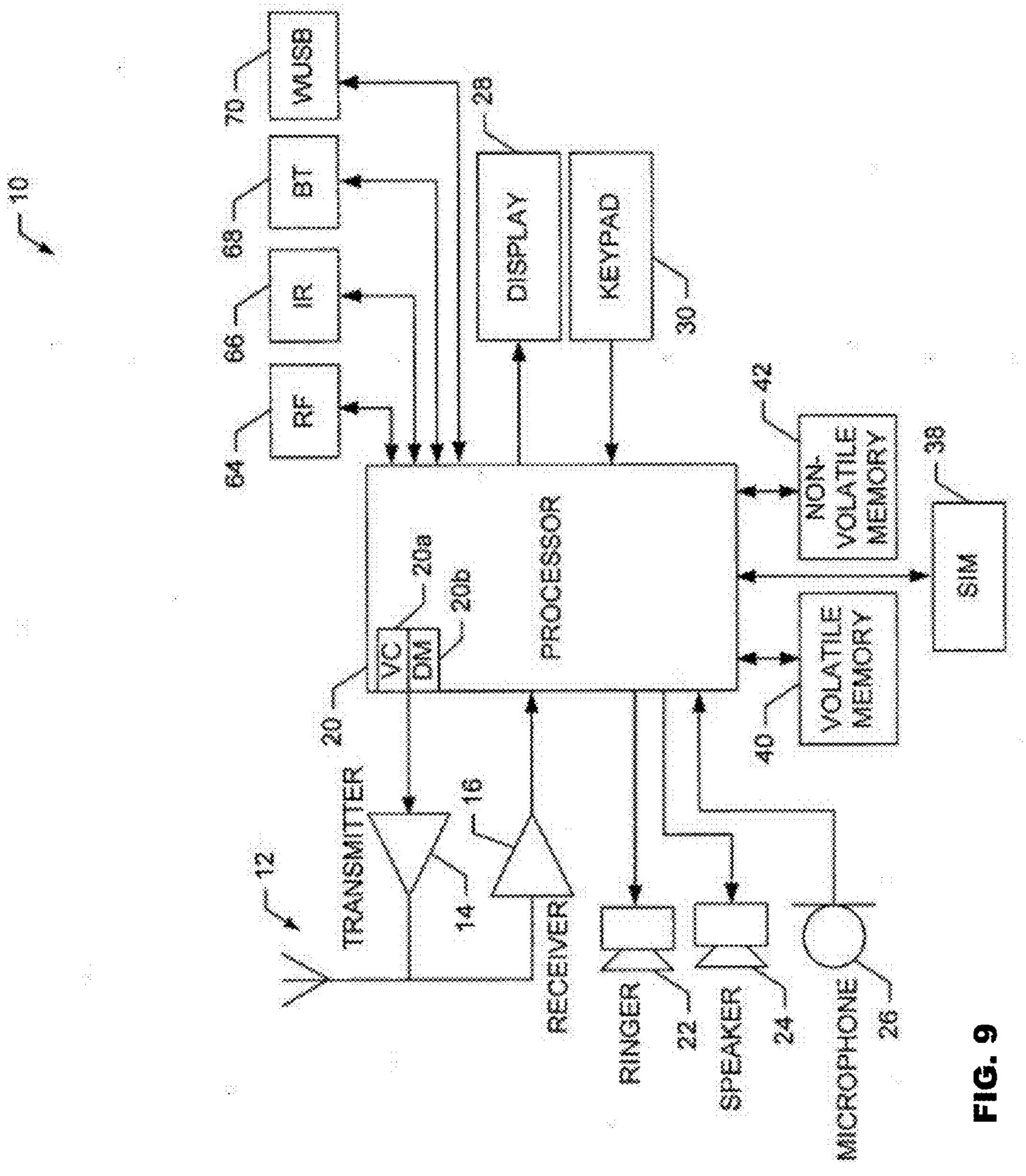
FIG. 9 depicts an example of a radio, in accordance with some example embodiments.

FIG. 9 illustrates a block diagram of an apparatus 10, in accordance with some example embodiments. Apparatus 10 may include a transmitter 14 and/or a receiver 16. Moreover, the tunable inductor disclosed herein may be used in the transmitter and/or receiver to enable tuning, filtering, and the like, although the tunable inductor may be used in other portions of apparatus 10 as well. Moreover, apparatus 10 may be implemented as a user equipment, such as a smart phone as well as any other type of radio including an access point and/or base station.

The apparatus 10 may, in some example embodiments, include at least one antenna 12 in communication with a transmitter 14 and a receiver 16. Alternatively transmit and receive antennas may be separate.

The apparatus 10 may, in some example embodiments, also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 9 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 9, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus to perform one or more of the operations disclosed herein with respect to the host, accessory device, and/or extension device. The memories may comprise an identifier, such as an international mobile equipment identification (IMEI) code, capable of uniquely identifying apparatus 10. The functions may include one or more of the operations disclosed with respect the tunable inductor disclosed herein. The memories may comprise an identifier, such as an international mobile equipment identification (IMEI) code, capable of uniquely identifying apparatus 10. In the example embodiment, the processor 20 may be configured using computer code stored at memory 40 and/or 42 to perform one or more of the operations disclosed herein with respect to the tunable filter.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 9, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is tunable coils that can be provided in a small form factor and/or that consume negligible power when in a stable state.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments may comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprising:

a chamber including a first cavity and a second cavity, wherein the chamber further includes a first fluid suspended in a second fluid;

a first electrode adjacent to the first cavity;

a second electrode adjacent to the second cavity;

a third electrode configured to provide a common electrode to the first electrode and the second electrode; and at least one coil adjacent to at least one of the first cavity or the second cavity, wherein an inductance value of the coil is varied by at least applying a driving signal between the common electrode and the first electrode and/or the second electrode.

2. The apparatus of claim 1, wherein the applied driving signal moves the first fluid.

3. The apparatus of claim 2, wherein the moving causes a change in a permeability of at least one of a core of the coil or a medium adjacent to the coil.

4. The apparatus of claim 1, wherein the first electrode is in contact, directly and/or through a coating, with at least one of the first fluid or the second fluid.

5. The apparatus of claim 1, wherein the first fluid and/or the second fluid includes one or more particles and/or one or more nanoparticles having a certain permeability.

6. The apparatus of claim 1, wherein the driving signal provides a field that affects the move of the first fluid.

7. The apparatus of claim 6, wherein the field produced by the driving signal includes at least one of an electric field, a magnetic field, and/or a combination of the two.

8. The apparatus of claim 1, wherein the at least one coil provides at least one of first electrode, the second electrode, and/or the common electrode.

9. The apparatus of claim 1, wherein the chamber is arranged at least one of on top, below, inlaid and/or within a substrate, and wherein the coil is arranged at least one of on top, below, inlaid, and/or within the substrate.

10. The apparatus of claim 1, wherein a plurality of cavities are arranged into a chain structure and/or a grid structure, wherein at least one coil is arranged adjacent to at least one of the cavities.

* * * * *